United States Patent [19]

Kaneko

[11] Patent Number: 4,463,915
[45] Date of Patent: Aug. 7, 1984

[54] BAIL ARM REVERSING STRUCTURE FOR SPINNING REELS FOR FISHING
[75] Inventor: Kyoichi Kaneko, Tokyo, Japan
[73] Assignee: Daiwa Seiko Inc., Higashikurume, Japan
[21] Appl. No.: 378,816
[22] Filed: May 17, 1982
[30] Foreign Application Priority Data
May 29, 1981 [JP] Japan .................. 56-78560[U]
[51] Int. Cl.³ ............................................ A01K 89/01
[52] U.S. Cl. ............................................ 242/84.2 G
[58] Field of Search .................. 242/84.1 R, 84.21 R, 242/84.2 G, 84.2 F

[56]       References Cited
       U.S. PATENT DOCUMENTS

| 3,550,874 | 12/1970 | Sarah | 242/84.2 G |
| 3,987,976 | 10/1976 | Lilland | 242/84.21 R |
| 4,147,313 | 4/1979 | Sazaki | 242/84.2 G |
| 4,196,868 | 4/1980 | Puryear et al. | 242/84.2 G |
| 4,208,020 | 6/1980 | Gifford | 242/84.2 G |
| 4,256,271 | 3/1981 | Ruin | 242/84.2 G |
| 4,279,387 | 7/1981 | Morimoto | 242/84.2 G |

Primary Examiner—Stuart S. Levy
Assistant Examiner—David Werner
Attorney, Agent, or Firm—Browdy and Neimark

[57] ABSTRACT

A bail arm reversing structure for spinning reels for fishing, comprising bail arm support members made of synthetic resin having shaft portions pivotably fitted in bottom portions of bail arm mounting elements made of synthetic resin with flange portions formed integrally with the support members stably engaged with and supported on the bottom surfaces of the mounting elements and inner surfaces of cover plates fitted in the mounting elements. Since the bail arm support members are joined to the bail arm mounting elements without using screws, and, since no clearances exist between these support members and mounting elements, the bail arm can be pivoted smoothly, and the fishing line is engaged therewith reliably. The flange portions of the bail arm support members also serve as parts engageable with a kick lever.

2 Claims, 4 Drawing Figures

BAIL ARM REVERSING STRUCTURE FOR SPINNING REELS FOR FISHING

BACKGROUND OF THE INVENTION

1. Field of the Invention

This invention relates to an improvement in a bail arm reversing structure for spinning reels for fishing.

2. Description of the Prior Art

The known systems for fastening a bail arm to bail arm mounting elements include a system in which the end portions of the bail arm are bent to be pivotably supported on bail arm mounting elements, as disclosed in U.S. Pat. No. 3,987,976, and a system in which bail arm support members, such as holders or arm levers are pivotably joined to bail arm mounting elements with screws, as disclosed in U.S. Pat. No. 4,147,313. In the former system, the pivotal movement of the bail arm is not smooth. Moreover, the bail arm used in this system does not have a sufficient strength against impact, nor does it withstand long-term use sufficiently. In the latter system, the screws loosen and fall from the pivotal movement of the bail arm, or the fishing line entangles in clearances between the bail arm mounting elements and the support members pivotably joined to these bail arm mounting elements.

SUMMARY OF THE INVENTION

The present invention has been developed with an aim of eliminating these drawbacks encountered in the conventional bail arm reversing structure of this kind.

A first object of the present invention is to provide a bail arm reversing structure which includes bail arm support members fitted in bail arm mounting elements rather than attached with screws thereto, to allow the bail arm to pivot forward smoothly from a fishing line rewinding position to a fishing line releasing position, and pivot back smoothly from the fishing line releasing position to the fishing line rewinding position, and which structure is therefore free from the drawbacks encountered in a conventional bail arm reversing structure in which the screws which pivotably fasten the bail arm support members to the bail arm mounting elements loosen and fall while the bail arm reversing structure is in use, or are tightened excessively or retightened repeatedly to strip their threads.

A second object of the present invention is to provide a bail arm reversing structure having no clearances between the bail arm support members and bail arm mounting elements that might allow the fishing line to be come entangled therein so the fishing line will be engaged smoothly and reliably, and to reduce thickness of the bail arm mounting elements to as great an extent as possible; and which can rewind the fishing line smoothly while maintaining a rotor in a balanced state.

A third object of the present invention is to provide a bail arm reversing structure, which includes bail arm support members pivotably fitted at shaft portions thereof onto bottom surfaces of bail arm mounting elements, and supported at flanges thereof formed continuously therewith on both the bottom surfaces of the bail arm mounting elements and the inner surfaces of cover plates, to thereby hold the bail arm support members with sufficiently large contact surfaces so it is held stably with respect to both the directions of rotation and the axes thereof and be pivoted smoothly, which has a high resistance to impact and pressure, and excellent durability.

A fourth object of the present invention is to provide a bail arm reversing structure including bail arm support members having flanges, some of which can be utilized also as parts to be engaged with a kick lever, whereby the structure can be assembled easily and with a reduced number of parts.

A further object of the present invention is to provide a bail arm reversing structure having bail arm support members, bail arm mounting elements, and a rotor, all of which could even be formed of a synthetic resin and maintain sufficiently high strength, is capable of being manufactured with a reduced weight owing to these synthetic resin parts, and minimizing the rotational inertia of the rotor.

The above and other objects as well as advantageous features of the invention will become apparent from the following description of the preferred embodiments taken in conjunction with the accompanying drawings.

DESCRIPTION OF THE PREFERRED EMBODIMENT

Figure 1:
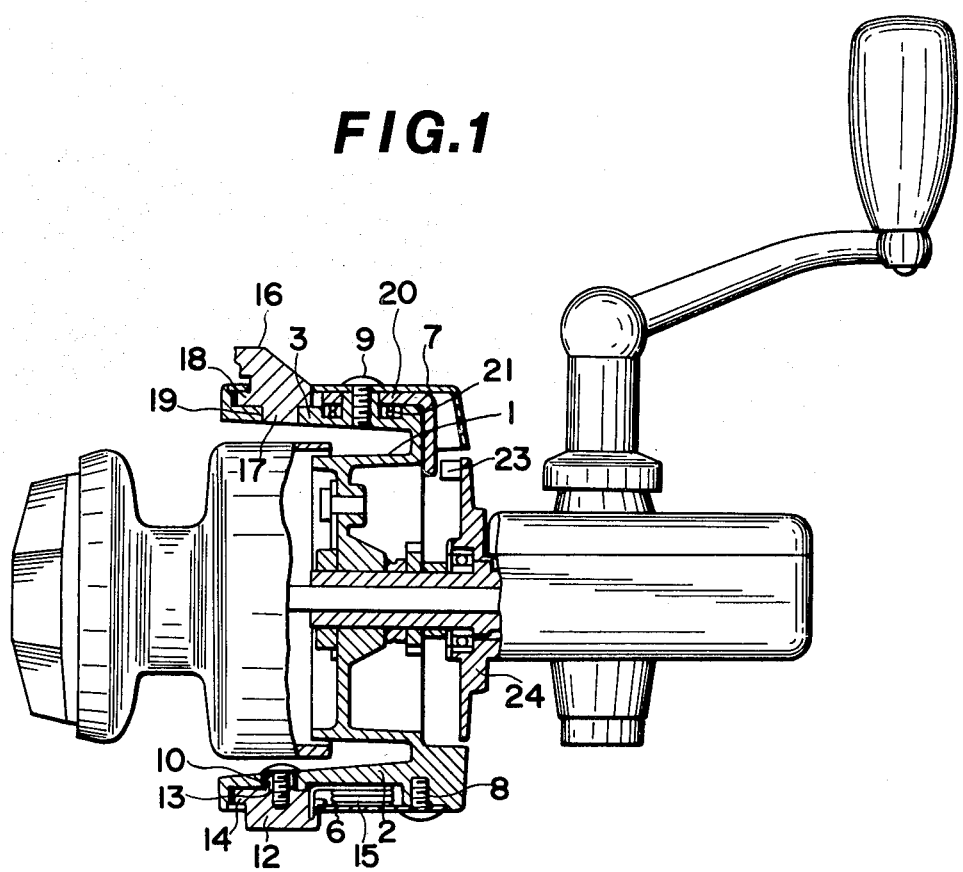
FIG. 1 is a partially cutaway plan view of the present invention.

An embodiment of the present invention will now be described with reference to the accompanying drawings. Bail arm mounting elements 2, 3 formed at both sides of, and integrally with, a rotor 1 of a spinning reel are provided with recesses 4, 5, respectively. Cover plates 6, 7 are fitted from the outside into the mounting elements 2, 3, respectively, with screws 8, 9.

A shaft portion 13 formed at a free end of an arm lever 12, to which a bail arm 11 is fixedly connected, is pivotably fitted in a bearing bore 10 provided in a bottom portion of a front section of the bail arm mounting element 2. A partially cutaway flange 14 is formed integrally with, and at a base section of, the shaft portion 13 of the arm lever 12. The flange 14 is held in the recess 4 in such a manner that an inner surface of the flange 14 is in contact with a bottom surface of the bail arm mounting element 2, with an outer surface thereof engaged with the cover plate 6.

The arm lever 12 referred to above is formed according to a known method in such a manner that the arm lever 12 can be urged freely by a dead point spring 15 provided in the recess 4, from a dead point to either of a fishing line rewinding position and a fishing line releasing position.

Flanges 18, 18' are formed integrally with, and at an end portion of, a bail arm holder 16, which is provided at the other end of the bail arm 11, in such a manner that the flanges 18, 18' substantially oppose each other with respect to a base section of a shaft portion 17 of the bail arm holder 16. The shaft portion 17 is pivotably fitted in a bearing bore 19 provided in a bottom portion of the bail arm mounting element 3. The flanges 18, 18' are held in the recess 5 in such a manner that the inner surfaces of the flanges 18, 18' are in contact with a bottom surface of the bail arm mounting element 3 with the outer surfaces thereof in contact with the cover plate 7, to thereby keep the bail arm holder 16 in a locked state. The flange 18 is adapted to come into engagement with a free end of a kick lever 20 when the bail arm 11 is reversed to a fishing line releasing position, and thereby allow the kick lever 20 to be urged against a base portion of the bail arm mounting element 3. The flange 18' is adapted to urge the free end of the kick lever 20 against the inner surface of the bail arm mounting element 3 when the bail arm 11 is returned to a fishing line rewinding position.

The kick lever 20 is provided in the same plane as the flanges 18, 18', and is bifurcated so as to be moved about the screw 9 which fastens the cover plate 7 to the bail arm mounting element 3. The kick lever 20 is constantly urged toward an end portion of the bail arm mounting element 3 by a spring 21. An operation portion, i.e. the other end portion, of the kick lever 20 is bent and projects inward through a bore 22 provided in a base portion of the bail arm mounting element 3.

Referring to the drawings, reference numeral 23 denotes a kick boss provided at a front portion of a casing 24 and adapted to operate the kick lever 20. The kick lever 20 in the embodiment shown in the drawings is bifurcated so as to be moved about the screw 9; it may be adapted to be moved with the screw 9 fitted in an elongated bore. The flange 18' is not strictly necessary, and may be omitted.

The bail arm mounting elements 2, 3, arm lever 12, arm holder 16 and rotor 1 may be formed of synthetic resin to reduce the weight of the reel suitably.

Figure 2:
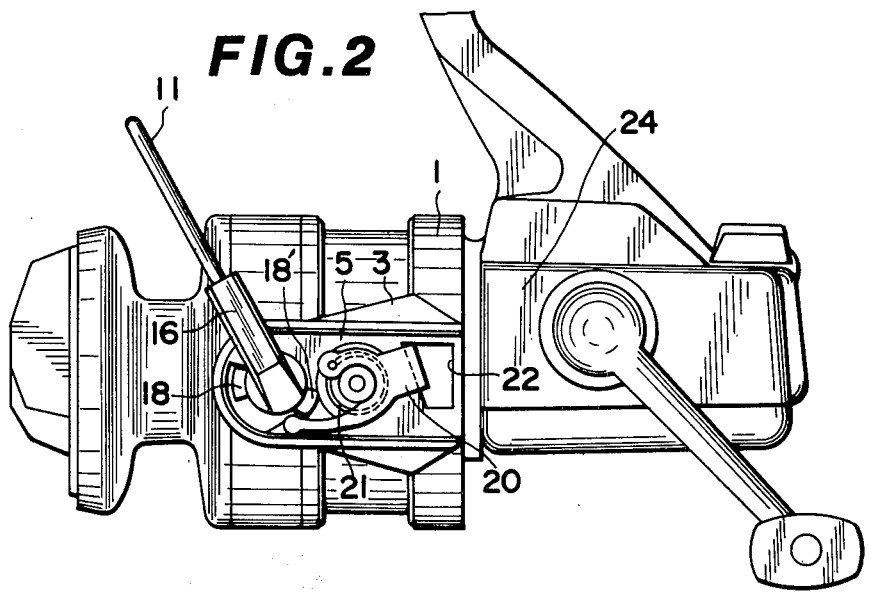
FIG. 2 is a front elevational view of the present invention with a cover plate removed, in a fishing line rewinding state.
Figure 3:
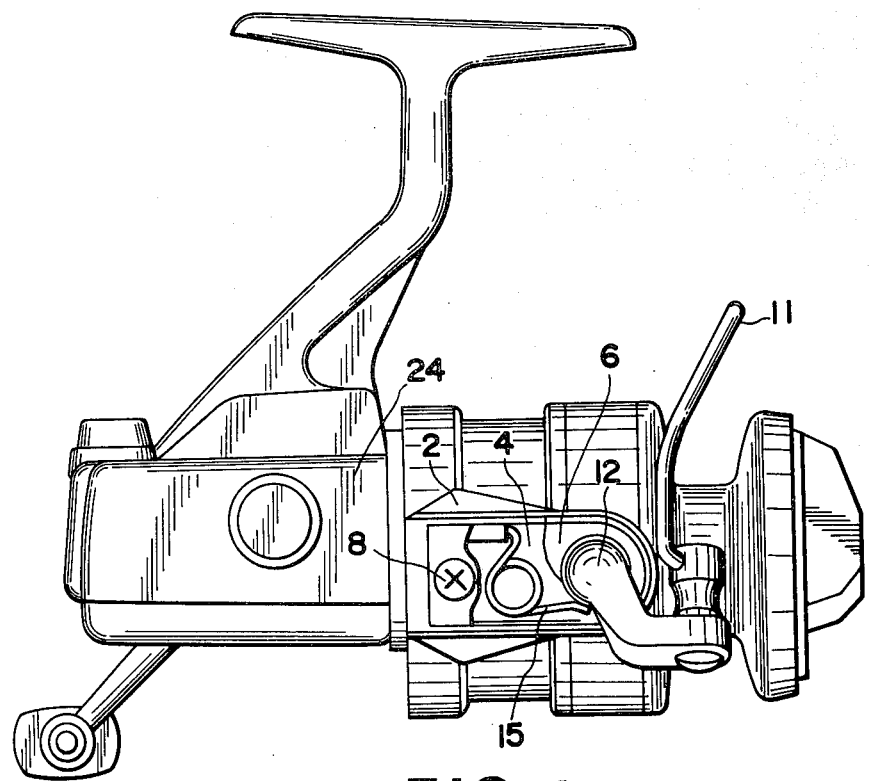
FIG. 3 is a rear view of the present invention with the cover plate thereof partially cut away, in a fishing line rewinding state.
Figure 4:
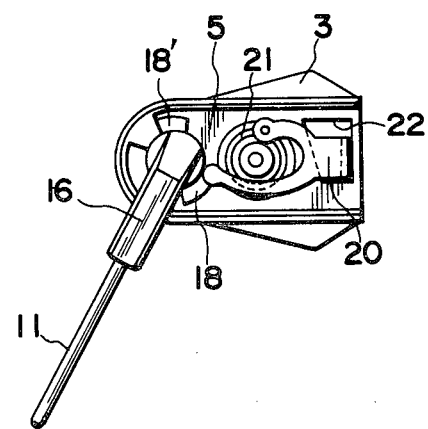
FIG. 4 is a front elevational view of a principal portion of the present invention with the cover plate removed, in a fishing line releasing state.

When the bail arm 11 of the embodiment constructed as described above of the present invention, which is in a fishing line rewinding position shown in FIG. 2, is reversed pivotally counterclockwise against the resilient force of the dead point spring 15, the flange 18 of the bail holder 16 comes into engagement with the kick lever 20 to press the same and move it to the base portion of the bail arm mounting element 2. The kick lever 20 then passes the dead point of the spring 15 to urge and hold the bail arm 11 in a fishing line releasing position, shown in FIG. 4.

When the rotor 1 is then turned by a handle, the bent and projecting portion of the kick lever 20 is struck upward by the kick boss 23 to be displaced to the end of the bail arm mounting element 2. Thus, the flange 18 is moved pivotally by the end portion of the kick lever 20 until the flange 18 passes the dead point of the spring 15 to return the bail arm 11 to the fishing line rewinding position shown in FIG. 2.

The present invention is not, of course, limited to the above-described embodiment; it may be modified in various ways within the scope of the appended claims.

What is claimed is:

1. A bail arm reversing structure for spinning reels for fishing, having a rotor, bail arm mounting elements formed at both sides of and integrally with said rotor, a bail arm adapted to engage a fishing line therewith and fastened to said mounting elements, a dead point spring urging said bail arm to move the latter from a dead point of the former to a fishing line rewinding position and a fishing line releasing position, and a bail arm returning means comprising bail arm support members to which said bail arm is fixedly joined, shaft portions formed at ends of said bail arm support members, bearing bores formed in bottom portions of said bail arm mounting elements and adapted to fit said shaft portions therein in such a manner that said shaft portions can be moved pivotally therein, and flange-like projections formed at base sections of, normal to, and integrally with, said shaft portions, said bail arm support members being recessed entirely within, and supported at, the inner side surfaces of the bottom portions of said bail arm mounting elements, and inner surfaces of cover plates fitted from the outside in said bail arm mounting elements.

2. A bail arm reversing structure for spinning reels for fishing, having a rotor, bail arm mounting elements formed at both sides of and integrally with said rotor, a bail arm adapted to engage a fishing line therewith and fastened to said mounting elements, a dead point spring urging said bail arm to move said bail arm from a dead point position to either of a fishing line rewinding position or a fishing line releasing position, and a bail arm returning means comprising an arm lever connected fixedly to one end of said bail arm, a shaft portion formed at an end portion of said arm lever, a recess formed in one of said bail arm mounting elements, a bearing bore formed at a bottom portion of said one of said bail arm mounting elements which fits said shaft portion pivotably therein, a flange-like projection formed normal to, and integrally with, said shaft portion, said flange-like projection being engaged and supported entirely within an inner side surface of the bottom portion of said bail arm mounting element, and an inner surface of a cover plate fitted from the outside in said bail arm mounting element, a spring provided in the other bail arm mounting element and engaged with said arm lever, a bail arm holder connected fixedly to the other end of said bail arm and having a shaft portion at an end portion thereof, a recess formed in the second-mentioned bail arm mounting element, a bearing bore formed in a bottom portion of the second-mentioned bail arm mounting element and adapted to fit said shaft portion of said bail arm holder therein in such a manner that said shaft portion of said bail arm holder can be moved pivotally therein, flange-like projections formed at a base section of and integrally with said shaft of said bail arm holder, and engaged and supported at both surfaces thereof with and on inner side surfaces of the bottom portion of the second-mentioned bail arm mounting element and an inner surface of a cover plate fitted from the outside in the second-mentioned bail arm mounting element, and a kick lever constituting said bail arm returning means, provided in the second-mentioned bail arm mounting element, operated by said flange-like projections formed on said bail arm holder, and adapted to be urged by said spring to a position, in which said kick lever is engaged with a kick boss forming on a casing, and a position, in which said kick lever is engaged with one of said flange-like projections formed on said bail arm holder.

* * * * *